Sept. 28, 1965     W. E. PAKALA ETAL     3,209,213
HIGH VOLTAGE RECTIFIER APPARATUS WITH CORONA SUPPRESSION MEANS
Filed April 11, 1961     4 Sheets-Sheet 1

WITNESSES:
Bernard R. Gieguey
Raymond C. Cheers

INVENTORS
William E. Pakala &
Robert G. Clark.
BY
F. E. Browder
ATTORNEY

Sept. 28, 1965  W. E. PAKALA ETAL  3,209,213
HIGH VOLTAGE RECTIFIER APPARATUS WITH CORONA SUPPRESSION MEANS
Filed April 11, 1961  4 Sheets-Sheet 4

United States Patent Office 3,209,213
Patented Sept. 28, 1965

3,209,213
HIGH VOLTAGE RECTIFIER APPARATUS WITH CORONA SUPPRESSION MEANS
William E. Pakala and Robert G. Clark, Forest Hills, Pa., assignors to Westinghouse Electric Corporation, East Pittsburgh, Pa., a corporation of Pennsylvania
Filed Apr. 11, 1961, Ser. No. 102,192
8 Claims. (Cl. 317—234)

This invention relates to high voltage rectifiers for converting alternating current to direct current.

High voltage direct current power supplies may be obtained by connecting a large number of semi-conductor rectifier cells in series circuit reationship. The stack of series connected rectifier cells are then mounted on a tray or chassis for support. Frequently, several of these trays or chassis are then connected in series circuit relationship to thereby produce even higher voltages. However, as the voltage output of these assemblies is increased the suppression or prevention of corona becomes a problem.

It is therefore an object of this invention to provide an improved high voltage rectifier.

It is another object of this invention to provide an inexpensive corona suppression arrangement for a high voltage rectifier.

It is another object of this invention to provide a corona shield arrangement that physically supports the rectifier units.

Still another object of this invention is to provide a corona shield arrangement that serves to electrically connect a plurality of rectifier units in circuit relationship.

Still another object of this invention is to provide an effective corona shield arrangement having an openness of design necessary to facilitate the ease of testing and maintenance of the component rectifier units.

Other objects and advantages of this invention will be apparent from the following description when taken in conjunction with the drawings, in which.

Figure 1:
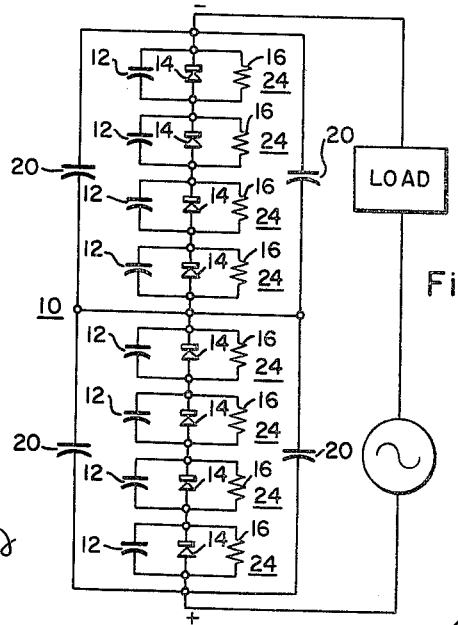
FIGURE 1 is a schematic diagram of a rectifier stack and circuit according to this invention.

Referring to FIG. 1, each rectifier component circuit or stage 24, comprises a diode 14, a resistor 16, and a capacitor 12 connected in parallel circuit relationship to form a three branch parallel circuit. A plurality of the component circuits 24 are serially connected to form a rectifier stack 10. The resistors 16 and the capacitors 12 are provided to distribute the reverse voltage equally across the rectifier stack 10. A plurality of capacitors 20 are provided to assist in the distribution of the reverse voltage across the rectifier stack 10. A parallel circuit comprising two capacitors 20 is connected from the positive end of the rectifier stack 10 to the center of said rectifier stack 10. Another parallel circuit comprising two capacitors 20 is connected from the center of the rectifier stack 10 to the negative end of said rectifier stack 10. The two capacitors 20 need not connect to the center of the stack. Should the stack be longer or shorter, more or less capacitors would be used. The rectifier stacks 10 may be connected to an alternating current source and to a load for utilizing the direct current output as shown schematically in FIG. 1.

The rectifier stack 10, as described above, may comprise many serially connected parallel circuits 24. All of the elements which make up the stack 10 are rigidly mounted on a support tray or chassis 22. To produce the required direct current voltage output a plurality of the trays 22 may be connected in series circuit relationship.

Figure 2:
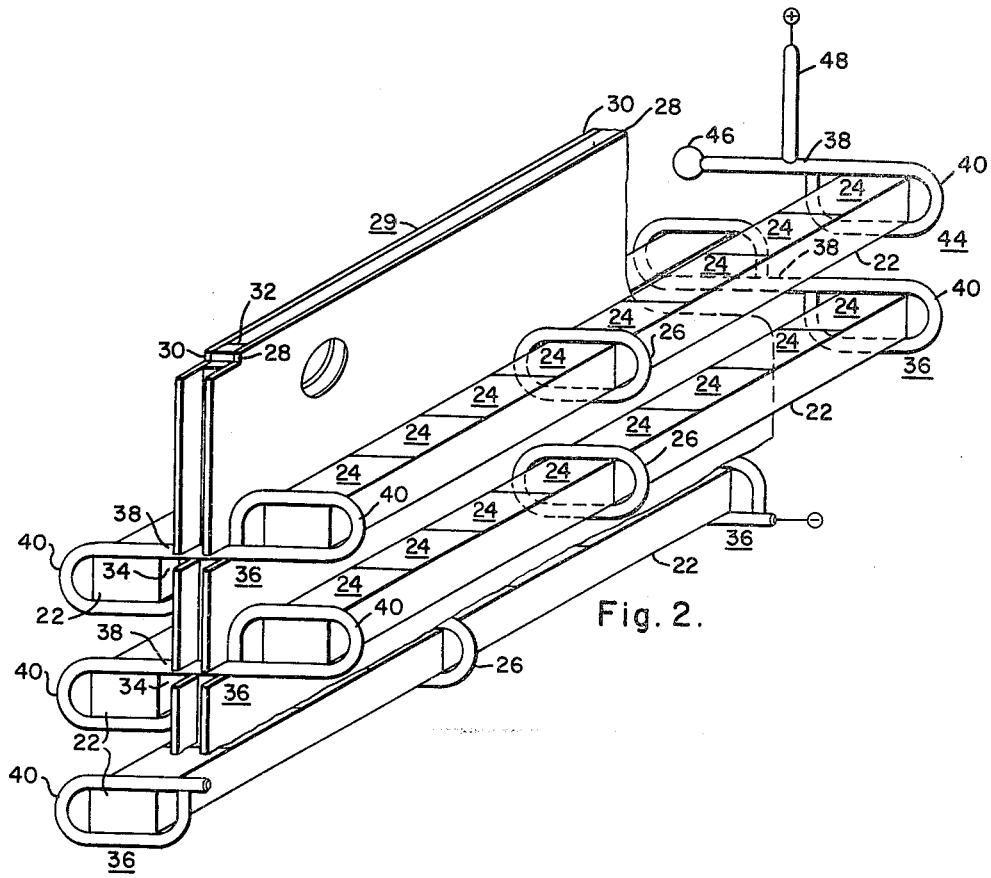
FIG. 2 is a partial view showing an assembly of a plurality of rectifier stacks with a corona shield arrangement as provided by this invention.

In the assembly shown in FIG. 2 a plurality of rectifier trays or chassis 22 are mounted on each side of a central support 29 in staggered relationship.

The central support 29 comprises two plate members 28 and 30, shown in FIG. 2. The members 28 and 30 are separated by a rectangular spacer member 32 near each vertical edge. The members 28, 30 and 32 are made from a suitable insulating material.

A plurality of horizontal slots 34 are provided in the edge of the central support members 28 and 30. The slots 34 receive a plurality of corona shields 36.

Figure 3:
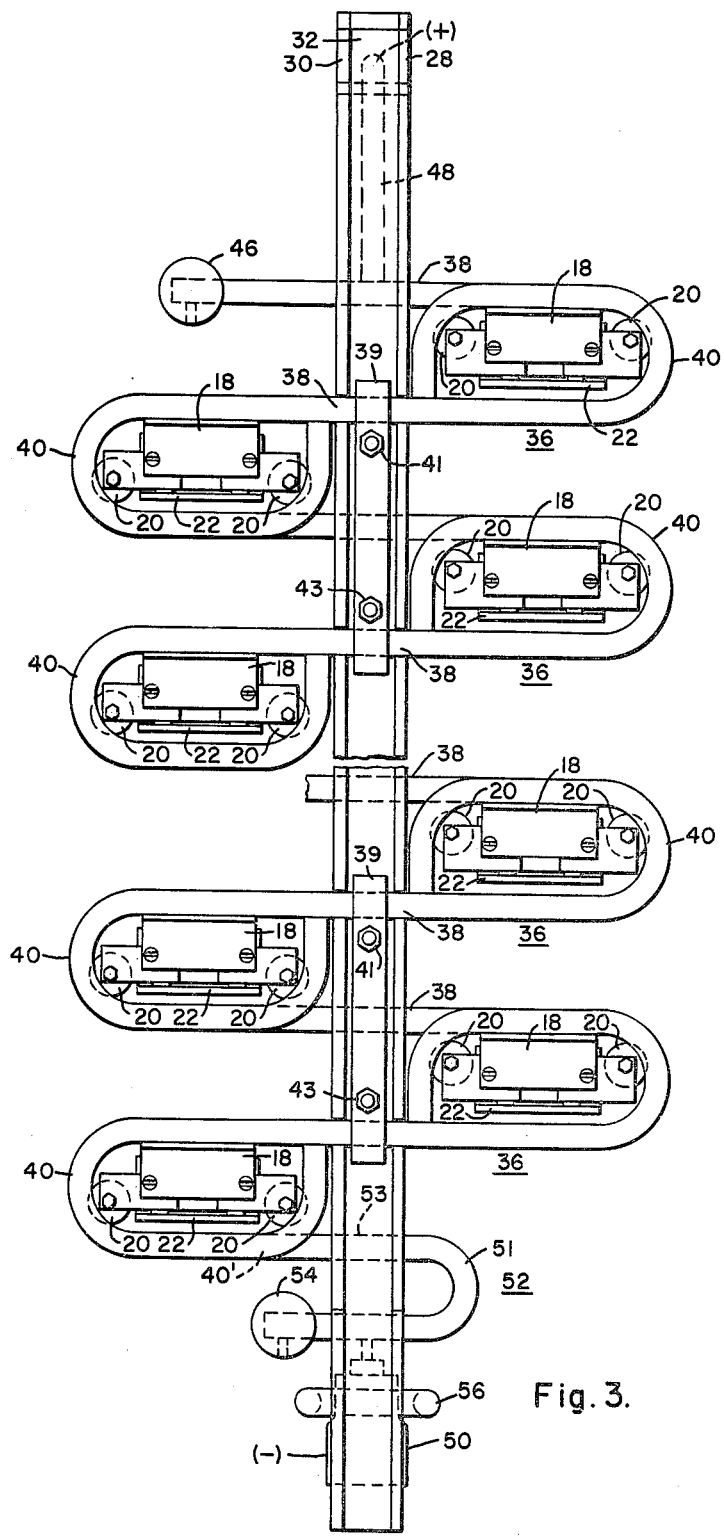
FIG. 3 is a side view of the assembly of FIG. 2.
Figure 4:
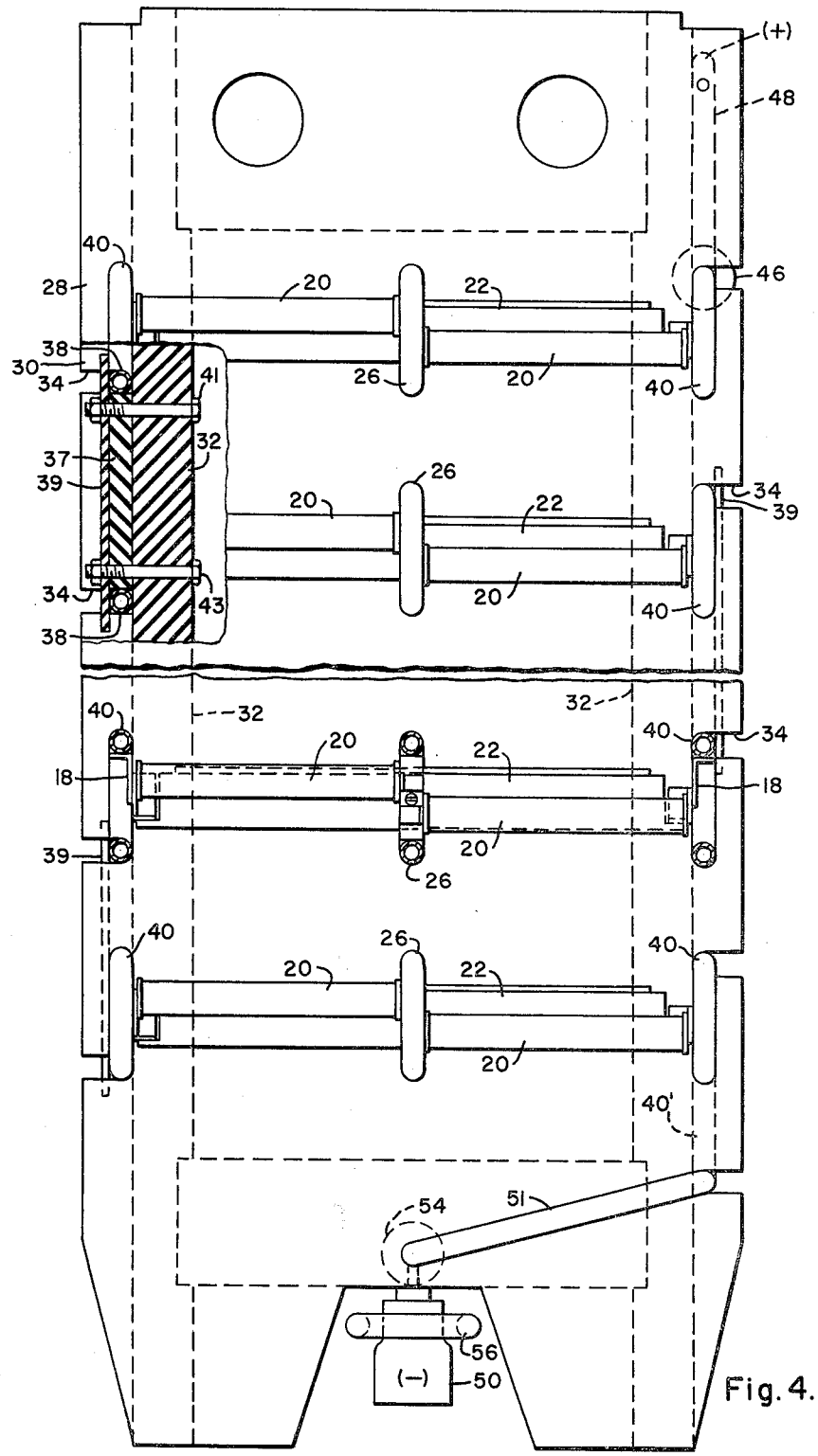
FIG. 4 is a front view of the assembly of FIG. 2.
Figure 5:
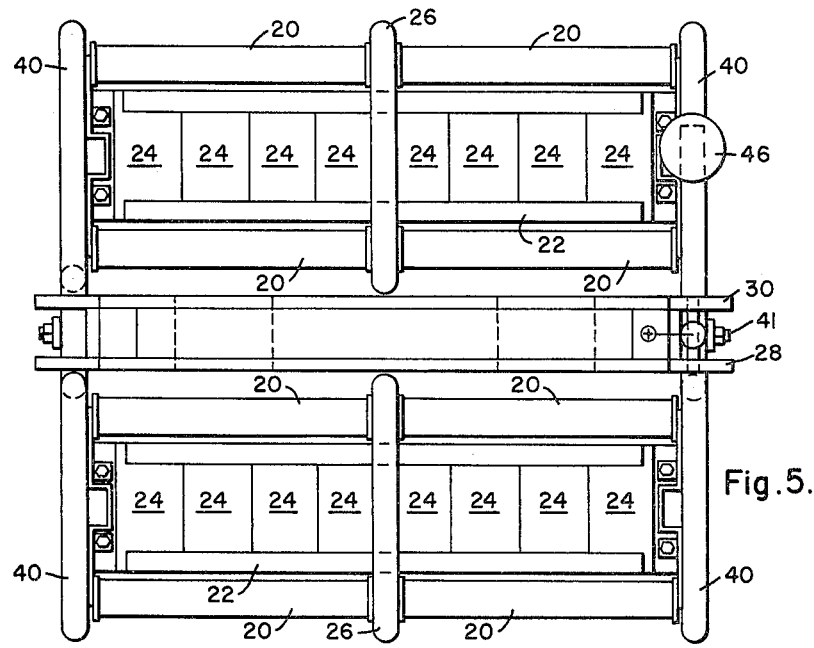
FIG. 5 is a top view of the assembly of FIG. 2.

The corona shields 36 are conducting elements having a straight portion 38 and a loop 40 at each end. One loop 40 is disposed in an upwardly direction from the straight portion 38 and the other loop 40 disposed downwardly from the straight portion 38. The corona shields 36 are supported by the members 28 and 30 by inserting the straight portion 38 of the corona shields 36 in the slots 34 in the support members 28 and 30. The trays or chassis 22 are assembled by inserting them into the loops 40. The loops 40 provide physical support for the trays 22 supporting the trays from the central support 29 and also electrically connects the rectifier trays 22 together. The tray or chassis 22, as shown in FIG. 3 and FIG. 4, is fastened to the loop 40 of the corona shield 36 by a thin conducting member 18 bent to form a right angle having one leg mechanically and electrically connected to the loop 40 and the other leg mechanically and electrically connected to the stack 10. It is seen that because of the upwardly and downwardly extending loops 40 that the trays 22 on one side of the central support 29 are in staggered relationship to the trays 22 on the opposite side of the central support 29.

The loops 40 of the corona shield 36 act as an electrical connector from the positive end of one tray 22 to the negative end of another tray 22 disposed in staggered relationship on the other side of the central support 29. The number of trays 22 to be serially connected and mounted on the structural support members 28 and 30 depends on the voltage desired.

The loops 40 of the corona shield 36 are made from tubular conducting material of circular cross section. All sharp points are removed from the outside of the material of the corona shields 36. The shields 36 also function to suppress or prevent corona formation around the stack 10.

For additional shielding against corona a loop 26, made from a tubular conducting material of circular cross section, is placed around the tray 22 and electrically connected to the rectifier stack 10 of each tray 22. As many of these loops 26 may be used as are desired. The loops 26 are supported by the trays 22. The loops 26 as well as the corona shields 36 have a very smooth surface to thereby reduce the tendency for corona to start. The loops 40 of the conducting corona shield 36 and the loops 26 increase the effective radius of the components mounted on the trays 22 and thereby suppress the corona around any protrusions or small diameter components, of the stacks 10, where corona is likely to start.

In FIG. 2, a corona shield 44 is provided with a loop 40 at one end to support the first or uppermost tray 22. The other end of the corona shield 44 is terminated in a sphere 46 to thereby prevent the formation of corona around the end due to the relatively smaller diameter of the tubular shield 44 with respect to the sphere 46. The corona shield 44 also has a straight section 48 extending upwardly between the support members 28 and 30 to provide a terminal means for connecting one end of the first or uppermost tray 22 to an external circuit. The shield 44 with a loop 40 at one end is attached to the uppermost tray 22 by a member 18 in the same manner as the loops 40 of the shields 36 are connected to the remaining trays.

Another terminal provided to make electrical connection with the external circuit is shown as the connector 50 in FIGS. 3 and 4, a tubular element 56 is placed around connector 50 to thereby suppress corona which would tend to form around the connector 50. A tubular conducting element 52 connecting the connector 50 to the end of the last or lowermost tray 22 has a loop 40' on one end exactly like the loops 40 on the corona shields 36. The loop 40' of the conducting element 52 is attached to one end of the last or lowermost tray or chassis 22 by a thin conducting member 18 in the same manner as the other trays 22 are connected to the loop 40 of the corona shields 36. The conducting element 52 has a straight portion 53 to be engaged with one of the slots 34 provided in support members 28 and 30 and is fastened to support members 28 and 30 exactly like the corona shields 36. The remaining portion of conducting element 52 is bent to form a semicircle 51 in a plane at an angle from the horizontal. One end of the semicircle 51 passes through the center of support members 28 and 30 and has a spherical member 54 placed thereon. The other end of said semicircle 51 of the support member 52 is a continuation of the straight section 53 provided for the attachment of the conducting element 52 to the supporting members 28 and 30.

The means of securing the corona shields 36, 44 and 52 to the member 29 is shown in FIG. 4. A rectangular insulator 37 having a thickness equal to the diameter of the corona shields 36, 44 and 52 and a length equal to the spacing from one shield 36, 44 or 52, to the next shield 36, 44 or 52, is placed between members 28 and 30 against spacer 32. Another member 39 made from insulating material is placed against member 37 with the ends extending over the shielding members 36, 44 or 52. Two non-metallic bolts 41 and 43 pass through holes provided in members 39, 37 and 32 to thereby fasten the shielding members 36, 44 and 52 to the support member 29.

The electrical continuity of the assembly is from the positive terminal provided for connection to the external circuit through corona shield 44, as shown in FIG. 2; through the stack 10 on the uppermost tray 22 on the front side of the support 29; through the uppermost corona shield 36; through the stack 10 on the uppermost tray or chassis 22 on the back side of the central support 29; through the second corona shield 36 on the first mentioned end; and through the second tray or chassis 22 on the front side of central support 29. The electrical path is continued back and forth through the trays or chassis 22 to the last or lowermost tray or chassis 22. Then from the lowermost chassis 22 to the corona shield 52 (shown in FIGS. 3 and 4) and finally to the terminal 50.

Figure 6:
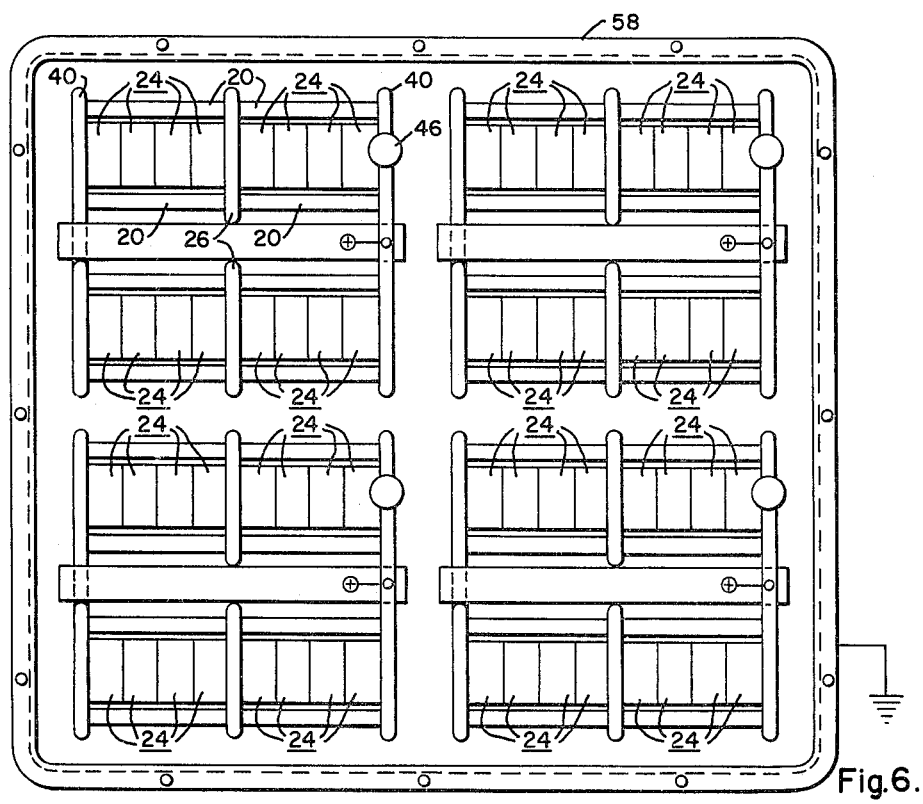
FIG. 6 shows a top view of a plurality of the assemblies shown in FIG. 1 mounted in a coolant container.

FIG. 6 shows a plurality of the completed rectifier assemblies placed in a coolant container 58. The container 58 may contain any coolant desired such as oil or sulfur hexafluoride ($SF_6$) and be sealed to outside atmosphere.

A unit substantially as described herein has been built and rated at 300,000 peak volts and 2 amperes. This unit was tested and found to be essentially corona free at 400,000 peak volts. This, however, is not a limit of the invention because the maximum corona free voltage is a function of the diameter of the tubing used to make the corona shield. Therefore, by increasing the diameter of the tubing the maximum corona free voltage would be increased.

It is also to be understood that the trays may be connected in a series-parallel circuit relationship, if desired, to thereby increase the current rating of said units.

Since numerous changes may be made in the above described apparatus and other embodiments of the invention may be made without departing from the spirit and scope thereof, it is intended that all the matter in the foregoing description or shown in the accompanying drawings shall be interpreted as illustrative and not in a limiting sense.

We claim as our invention:

1. A high voltage rectifier comprising a central support member, a plurality of corona shields mounted on said central support member at spaced intervals, a plurality of trays, each of said trays having a plurality of rectifier devices mounted thereon and connected in circuit relationship, said trays being supported at spaced intervals on said central support member by said corona shields, each said corona shield having a loop portion which surrounds a portion of the tray which it supports and a portion attached to said central support member, and means comprising said corona shields for connecting all of said trays in circuit relationship.

2. A high voltage rectifier comprising a central support member, a plurality of corona shields mounted on said central support member at spaced intervals, said corona shields having a straight central portion with a loop portion at each end, said corona shields being mounted on said central support member at spaced intervals by said straight portion so that a loop will extend on each side of said central support member, a plurality of trays each having a plurality of rectifier devices connected in circuit relationship mounted thereon, said trays being supported at spaced intervals on both sides of said central support member by the loops provided on said corona shields, each loop surrounding a portion of the tray it supports, and means comprising said corona shields for connecting all of said trays in circuit relationship.

3. A high voltage rectifier comprising a central support member, a plurality of corona shields mounted on said central support member at spaced intervals, said corona shields having a straight portion with a loop disposed upwardly from the straight section at one end and a loop disposed downwardly from the straight section at the other end, said corona shields being mounted at spaced intervals on said central support member by said straight portion so that said loops extend on each side of the central support member in staggered relationship to each other, a plurality of trays each having a plurality of rectifier devices connected in circuit relationship mounted thereon, a plurality of said trays being supported at spaced intervals on one side of said central support member by said upwardly disposed loops and a plurality of said trays being supported at spaced intervals on the other side of said central support member by the downwardly disposed loops to thereby cause said trays to be at different elevations on opposite sides of said central support member, each loop to surround a portion of the tray it supports, and means comprising said corona shield for connecting all of said trays in circuit relationship.

4. A high voltage rectifier comprising a central support member, a plurality of corona shields, said central support member having a notch provided at spaced intervals to thereby support said corona shields, said corona shields having a straight central portion with a loop at each end, said corona shields being mounted on said central support member at spaced intervals by said straight portion so that a loop will extend on each side of said central support member, a plurality of trays each having a plurality of rectifier devices connected in circuit relationship mounted thereon, said trays being supported at spaced intervals on both sides of said central support member by the loops provided on said corona shields, each said loop surrounding a portion of the tray it supports, and means comprising said corona shields connecting all of said trays in circuit relationship.

5. A high voltage rectifier comprising a central support member, a plurality of first corona shields mounted on said central support member at spaced intervals, said first corona shields having a straight central portion with a loop at each end, said first corona shields being mounted on said central support member at spaced intervals by said straight portion so that a loop extends on each side of said central support member, a plurality of trays each having a plurality of rectifier devices connected in circuit relationship mounted thereon, said trays being supported at spaced intervals on both sides of the central support member by the loops of said first corona shields, each loop of said first corona shield surrounding a portion of the tray it supports, a plurality of second corona shields, each of said second corona shields being a closed loop of a tubular conducting material mechanically supported and electrically connected at spaced intervals along each of said trays, and means comprising said first corona shields for connecting all of said trays in circuit relationship.

6. A high voltage rectifier comprising a central support member, a plurality of first corona shields mounted on said central support member at spaced intervals, said first corona shields having a straight central portion with a loop at each end, said first corona shields being mounted on said central support member at spaced intervals by said straight portion so that a loop extends on each side of said central support member, a plurality of trays each having a plurality of rectifier devices connected in circuit relationship mounted thereon, said trays being supported at spaced intervals on both sides of the central support member by the loops of said first corona shields, each loop surrounding a portion of the tray it supports, a plurality of second corona shields, each of said second corona shields being a closed loop of tubular conducting material mechanically supported and electrically connected at spaced intervals along each of said trays, one end of an uppermost tray being supported by a third corona shield, said third corona shield having a straight portion with a loop at one end and the other end terminated in a sphere, first terminal means comprising said third corona shield connecting said uppermost tray to an external circut, an end of a lowermost tray being supported by a fourth corona shield, said fourth corona shield having a straight portion with a loop at one end, the other end of said straight portion of said fourth corona shield being a semicircle in a plane at an angle with the horizontal and terminating in a sphere, second terminal means comprising said fourth corona shield connecting said lowermost tray to an external circuit, and means comprising said corona shields for connecting all of said trays in circuit relationship.

7. A high voltage rectifier comprising a central support member, a plurality of corona shields mounted on said central support member at spaced intervals, said corona shields having a straight central portion with a loop at each end, said corona shield being mounted on said central support member at spaced intervals by said straight portion so that a loop will extend on each side of said central support member, a plurality of trays each having a plurality of rectifier devices connected in circuit relationship mounted thereon, said tray being supported at spaced intervals on both sides of said central support member by the loops of said corona shields, each loop surrounding a portion of the tray it supports, and means comprising said corona shields for connecting all of said trays in circuit relationship, a plurality of said high voltage rectifiers being assembled in a tank filled with a cooling fluid, said tank being sealed to the atmosphere.

8. A high voltage rectifier comprising a central support member, a plurality of corona shields mounted on said central support member at spaced intervals, said corona shields having a straight central portion with a loop at each end, said corona shield to be mounted on said central support member at spaced intervals by said straight portion so that a loop will extend on each side of said central support member, a plurality of trays each having a plurality of rectifier devices connected in circuit relationship mounted thereon, said trays being supported at spaced intervals on both sides of said central support member by the loops of said corona shields, each loop to surround a portion of the tray it supports, and means comprising said corona shields for connecting all of said trays in circuit relationship, a plurality of said high voltage rectifiers being placed in a tank filled with sulfur hexafluoride ($SF_6$), said tank being sealed to the atmosphere.

References Cited by the Examiner

UNITED STATES PATENTS 1,905,629    4/33    Corbitt _____ 317—234
2,412,987   12/46    Hoffman _____ 174—127

DAVID J. GALVIN, *Primary Examiner.*

GEORGE N. WESTBY, *Examiner.*